April 21, 1936. G. M. PESTARINI 2,038,380
DYNAMO-ELECTRIC DIRECT CURRENT GENERATOR
Filed April 3, 1934
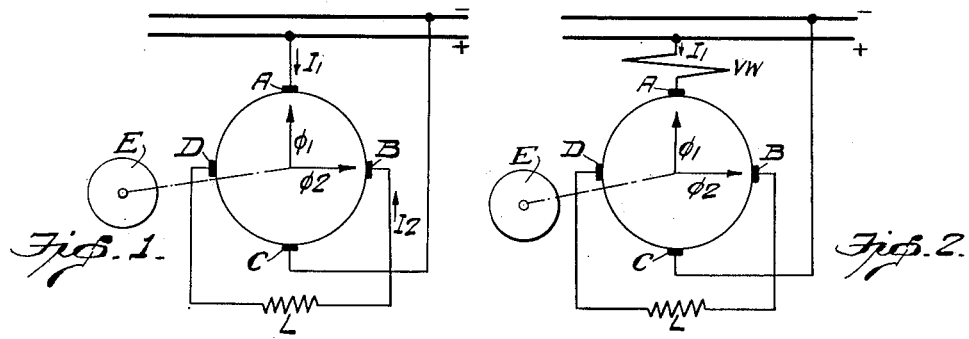
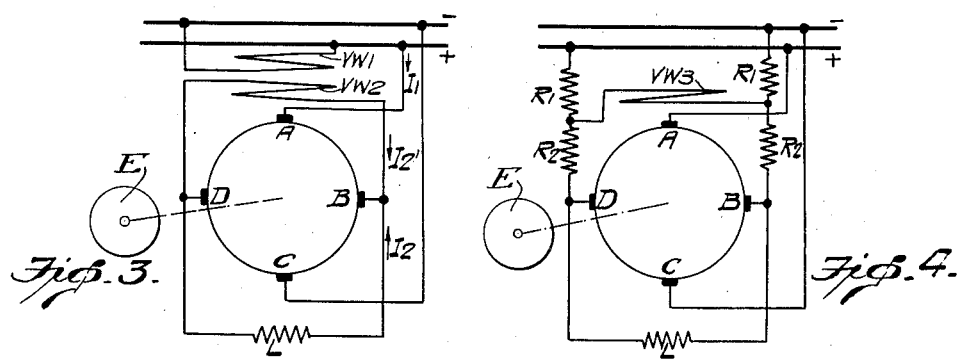
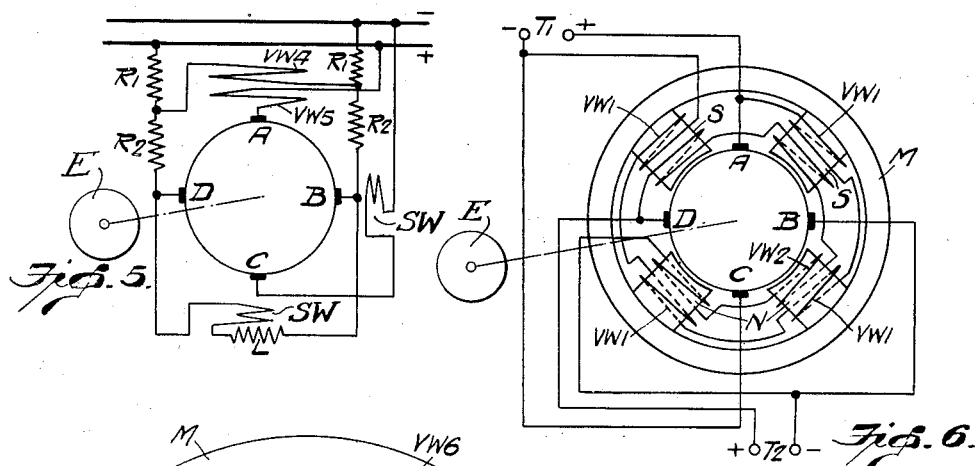
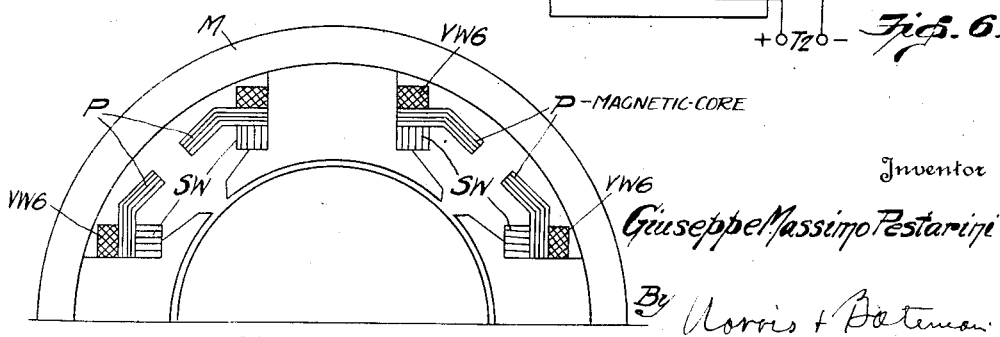
Inventor
Giuseppe Massimo Pestarini
By Norris + Bateman
Attorney Patented Apr. 21, 1936

2,038,380

UNITED STATES PATENT OFFICE 2,038,380

DYNAMO-ELECTRIC DIRECT CURRENT GENERATOR

Giuseppe Massimo Pestarini, Sheffield, England

Application April 3, 1934, Serial No. 718,852
In Great Britain April 3, 1934

19 Claims. (Cl. 171—223)

This invention relates to dynamoelectric direct current generators of the kind known as metadyne generators.

The main object of the invention is to devise an improved metadyne generator which shall in particular have a quick response to variations in the load circuit.

In order that the invention may be more clearly understood reference will be made in the following description to the accompanying drawing wherein Fig. 1 shows diagrammatically an arrangement of a metadyne transformer.

Fig. 2 shows also diagrammatically an arrangement of a metadyne generator.

Fig. 3 shows similarly an improved arrangement of a metadyne generator, in accordance with the invention.

Figs. 4 and 5 each show further improved arrangements, whilst

Fig. 6 is a practical winding diagram of the arrangement shown diagrammatically in Fig. 3, whilst Fig. 7 is a fragmentary view illustrating an arrangement for increasing the property of quick response.

Referring first of all for purposes of explanation to Fig. 1, this shows a metadyne transformer comprising a rotor provided with windings and a commutator somewhat similar to the armature of a direct current dynamoelectric machine. Four sets of brushes A, B, C and D are arranged around the commutator, the brushes A and C constituting the primary brushes by which current is led into and out of the armature from a source of direct current supply. Two other brushes B and D constitute the secondary brushes by which the current generated in the armature is led to the load circuit. The rotor is rotated by an auxiliary driving machine E at a constant speed in the magnetic field which is due to the currents circulating in the rotor windings, a stator as shown in Fig. 6, being provided which affords a return path of low magnetic reluctance for the flux which is set up by the rotor currents. The action of a metadyne transformer is briefly as follows: The primary current $I_1$ sets up a flux $\Phi_1$ in line with the primary brushes; this flux $\Phi_1$ in turn produces an electromotive force between D and B. Since D and B are joined externally through the load circuit a current will flow producing a flux $\Phi_2$ in line with the secondary brushes. This will in turn produce a back electromotive force between the primary brushes. Now the primary current flowing will be proportional to the difference between the applied voltage across the primary brushes and the back electromotive force. The back electromotive force, however, as pointed out above, is produced by $\Phi_2$ and hence is proportional to $I_2$.

It follows therefore that any variation in $I_2$ will produce a correspondingly opposite variation in $I_1$ which will tend to maintain $I_2$ constant. Supposing, for instance that, due to an increase in resistance of the secondary load circuit, $I_2$ tends to decrease, then it follows that $\phi_2$ will also decrease. Hence the primary back electromotive force will decrease, $I_1$ will therefore increase, $\Phi_1$ will also increase, and hence the electromotive force induced across the secondary brushes B and D will increase. This will tend to maintain $I_2$ constant and consequently $\phi_2$ will also tend to be maintained constant. Hence the characteristic of the machine is to maintain a constant secondary current, the secondary volts, however, and also the primary current varying according to load conditions. Neglecting losses $V_1I_1$ will normally equal $V_2I_2$, where $V_1$ is the primary voltage and $V_2$ the secondary voltage.

Normally also the machine is torqueless, a motoring torque being produced by the reaction between $I_1$ and $\phi_2$ and a generating torque being produced by the reaction between $I_2$ and $\phi_1$; since, however, $I_1\phi_2=I_2\phi_1$ under normal conditions the two torques are equal and opposite so that here is no resultant torque. Considering, now, the arrangement shown in Fig. 2 in which a field winding VW hereafter referred to as a variator winding is so arranged on the stator that its field acts in the same direction as the primary armature field $\phi_1$. Since, however, $\phi_1$ remains constant when the load resistance L is constant, the addition of the winding VW will decrease $I_1$, so as to maintain constant the ampere turns producing $\phi_1$, the other factors remaining substantially unaltered.

We now have the conditions that $V_1I_1<V_2I_2$, also $I_1\phi_2<I_2\phi_1$. In other words the output is greater than the input and the generating torque is greater than the motoring torque. Hence the machine must act as a generator and obtain power mechanically from the machine E driving it.

The machine has now become a metadyne generator.

An important property of the metadyne generator is that of "quick response" by which is meant the fact that a small percentage variation in the secondary current caused by a change in the voltage of the secondary circuit will result in a large percentage change in the difference between the primary voltage and the primary back electromotive force, and consequently a large variation in the primary current. This variation reacts to produce a large variation in the secondary electromotive force, which means that a quick response is obtained.

This factor of quick response is principally due to the fact that the fluxes are produced in the armature having a laminated core preventing the production of retarding eddy currents and that a part of the flux, instead of completing its path through the stator frame, will leak around the air paths and hence be substantially free from damping influences.

In the case of a metadyne generator employing a variator winding arranged as shown in Fig. 2 this property of quick response will be somewhat lessened, due to the fact that the variator winding VW constitutes an inductance inserted in the primary electrical circuit and hence, by increasing the time constant of this circuit, will exert a damping effect on changes of current.

The main object of the present invention is to devise an improved metadyne generator employing a variator winding or windings wherein damping of the electrical circuits by the variator winding is substantially reduced.

According to the present invention, therefore, a metadyne generator is provided with a variator winding producing flux substantially along the axis of the primary brushes, that is, substantially on the axis of the primary flux. This winding is excited in parallel with the load circuit supplied by the secondary current through the armature.

Conveniently several variator windings may be provided. Fig. 3 illustrates an example in which there are two variator windings VW1 and VW2, the rotor of the metadyne being driven at constant speed by the machine E. The winding VW1 is excited from the constant voltage supply in parallel with the supply passing to the primary brushes A and C. The winding VW2 is connected across the brushes D and B in parallel with the load L and is excited by a current I2' supplied from the secondary brushes. Alternatively the winding VW1 might be excited from an independent source of supply.

In Fig. 4 is shown an arrangement wherein the variator winding VW3 is excited partly from the supply to the primary and partly from the secondary circuit, resistances R1 between the variator winding and the primary supply and R2 between the variator winding and secondary circuit respectively to ensure that the currents through the variator winding are proportional to the primary and secondary voltages respectively, whilst at the same time limiting the currents flowing between the primary and secondary circuits.

Fig. 5 shows an arrangement wherein two variator windings VW4 and VW5 are provided as in Fig. 3, the winding VW4 being excited in a similar manner to the winding VW3 shown in Fig. 4. VW5 is, however, shown as excited in series with the primary circuit. This arrangement is one which is intended to give only a moderately quick response. The rotor of the metadyne is driven at substantially constant speed by the machine E, as shown in Figs. 5 and 6.

Fig. 6 is a winding diagram for the arrangement illustrated in Fig. 3.

In the arrangement shown the poles SS each produce a flux in a direction outwards and the poles NN produce a flux in an inward direction, the resultant flux being vertically upwards in a direction from C to A. T1 are the input terminals from the source of constant voltage and T2 the output terminals leading to the secondary load circuit.

In many cases it may be desirable to employ stabilizing windings on the metadyne generator to damp out surges and oscillations. These windings consist essentially of relatively small windings arranged magnetically in one circuit and electrically in the other, as indicated at SW in Fig. 5. A secondary stabilizer for instance would consist of a coil producing a flux along the primary brush axis, that is, on the axis of the primary flux and excited in series with the secondary brushes, the direction of the flux being such as to oppose the armature primary flux $\phi_1$. Suppose now that the secondary current $I_2$ increases there will be a reduction in the primary flux $\phi_1$ and hence a reduction in the secondary E. M. F. across B and D which will tend to maintain $I_2$ constant. An alternative way of regarding this is to consider that a back E. M. F. is injected into the secondary circuit upon an increase in current. The stabilizing winding therefore has an analogous effect to a resistance inserted in the secondary circuit and serves the purpose of damping out sudden oscillations and surges that may tend to arise in the circuit. Similarly a primary stabilizer may be employed for damping out surges in the primary circuit; such a winding would be arranged in series with the primary current and disposed to generate a flux along the secondary brush axis, that is, on the axis of the secondary flux and in the same direction as this armature flux. As above explained the property of quick response possessed by the metadyne is principally due to the fact that the armature is laminated and that a proportion of flux leaks around the air gap and since this leakage flux does not pass through any solid metal in which eddy currents might be generated it is substantially free from damping. This effect may be increased by providing additional leakage paths between the poles. These leakage paths may consist of laminated iron members projecting laterally from the poles, as shown at P in Fig. 7.

Fig. 7 shows diagrammatically an arrangement wherein stabilizer windings SW are employed and these are located on the poles N and S relatively near to the pole faces. Variator windings VW6 are located on the ends of the poles nearest the magnet frame or yoke M whilst between the variator and stabilizer windings VW6 and SW laminated iron members P are provided which projecting laterally from the said poles provide an additional leakage path for the armature flux which by-passes the solid magnet frame M and which since it does not contain any solid iron is substantially free from damping. In cases where there are interpoles intervening the laminated members would be shaped to pass around these.

It will be perceived that an air gap must be provided between the laminated members in adjacent opposite poles which gap would preferably be greater than twice the air gap between the armature and pole faces or in other words greater than the combined air gaps opposite the N and S poles so that the flux due to the variator winding is not unduly by-passed.

The arrangement described also possesses the advantage and whilst the armature leakage path through the laminated members is linked with the stabilizing winding it is not linked with the variator winding.

It will be readily appreciated that whilst in the foregoing description a four brush metadyne generator has been described the invention is not so limited but any number of brushes which is a multiple of four might be employed.

Having now particularly described and ascertained the nature of my said invention and in what manner the same is to be performed, I declare that what I claim is:

1. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a flux substantially on the axis of said primary flux, and means including a resistance connecting said primary and secondary circuits for energizing said variator winding.

2. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a component of flux on the axis of said primary flux, and means including a resistance connecting said primary and secondary circuits for energizing said variator winding.

3. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a flux substantially on the axis of said primary flux, and means including resistances connecting said variator winding across said primary circuit and said secondary circuit respectively for energizing said variator winding.

4. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a component of flux on the axis of said primary flux, and means including resistances connecting said variator winding across said primary circuit and said secondary circuit respectively for energizing said variator winding.

5. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a flux substantially on the axis of said primary flux, and means including resistances connecting said variator winding in parallel with said primary circuit and said secondary circuit respectively for energizing said variator winding.

6. A metadyne generator having a rotor provided with windings and a commutator connected thereto, means including primary brushes associated with said commutator for providing a primary circuit through said rotor and for producing a primary flux, a load circuit, means including said load circuit and secondary brushes associated with said commutator electrically displaced from said primary brushes for providing a secondary circuit through said rotor, means including a variator field-exciting winding for producing a component of flux on the axis of said primary flux, and means including resistances connecting said variator winding in parallel with said primary circuit and said secondary circuit respectively for energizing said variator winding.

7. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field-exciting winding associated with said stator and connected across said secondary brushes for producing a resultant flux substantially on the axis of said primary flux, and means associated with said stator for providing an additional leakage path for flux produced by said rotor.

8. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field-exciting winding associated with said stator and connected across said secondary brushes for producing a component of flux on the axis of said primary flux, and means associated with said stator for providing an additional leakage path for flux produced by said rotor.

9. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field-exciting winding associated with said stator and connected across said secondary brushes for producing a component of flux on the axis of said primary flux, means associated with said stator for providing an additional leakage path for flux produced by said rotor, and means including a stabilizing field exciting winding associated with said stator and connected across said primary brushes for producing a component of flux on the axis of said secondary flux.

10. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field exciting winding associated with said stator and connected across said secondary brushes for producing a component of flux on the axis of said primary flux, means associated with said stator for providing an additional leakage path for flux produced by said rotor, and means including a stabilizing field exciting winding associated with said stator and connected across said secondary brushes for producing a component of flux on the axis of said primary flux.

11. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field-exciting winding associated with said stator and connected across said secondary brushes for producing a component of flux on the axis of said primary flux, means associated with said stator for providing an additional leakage path for flux produced by said rotor, and means including a stabilizing field-exciting winding associated with said stator and connected across said primary brushes for producing a resultant flux substantially on the axis of said secondary flux.

12. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator associated with said rotor for providing a flux path of low reluctance for fluxes produced by said rotor, means including a variator field-exciting winding associated with said stator and connected across said secondary brushes for producing a component of flux on the axis of said primary flux, means associated with said stator for providing an additional leakage path for flux produced by said rotor, and means including a stabilizing field-exciting winding associated with said stator and connected across said secondary brushes for producing a resultant flux substantially on the axis of said primary flux.

13. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator having salient poles and associated with said rotor for providing a flux path of low reluctance for fluxes produced by said rotor, means including a variator field-exciting winding associated with said stator and connected across said secondary brushes for producing a component of flux on the axis of said primary flux, means including a stabilizing field-exciting winding associated with said stator and connected across said primary brushes for producing a component of flux on the axis of said secondary flux, said variator field-exciting winding and said stabilizing field-exciting winding being arranged on said salient poles, and means on said poles for providing an additional leakage path from said salient poles for fluxes in said stator.

14. A metadyne generator having a rotor provided with windings and a commutator, means including primary brushes associated with said commutator for providing a primary circuit through said rotor and for producing a primary flux, a load circuit, means including said load circuit and secondary brushes electrically displaced from said primary brushes for providing a secondary circuit through said rotor and for producing a secondary flux, means including a stator having salient poles and associated with said rotor for providing a flux path of low reluctance for fluxes produced by said rotor, means including a variator field-exciting winding associated with said stator and connected across said secondary brushes for producing a component of flux on the axis of said primary flux, means including a stabilizing field-exciting winding associated with said stator and connected across said primary brushes for producing a component of flux on the axis of said secondary flux, said variator field-exciting winding and said stabilizing field-exciting winding being arranged on said salient poles, and means on said poles interposed between said variator winding and said stabilizing winding for providing an additional leakage path from said salient pole for fluxes in said stator.

15. A metadyne generator having a rotor provided with windings and a commutator connected thereto, means including a primary brush set associated with said commutator for providing a primary circuit through said rotor and for producing a primary flux, means including a secondary brush set associated with said commutator and electrically displaced from said primary brush set for providing a secondary circuit through said rotor, means for electrically interconnecting the brushes of said secondary brush set, a variator field exciting winding arranged to affect said primary flux, means dependent upon the relation of electrical potential across said primary brush set and the electrical potential across said secondary brush set for energizing said variator field exciting winding.

16. A metadyne generator having a rotor provided with windings and a commutator, means including a primary brush set associated with said commutator for providing a primary circuit through said rotor and for producing a primary flux, means including a secondary brush set electrically displaced from said primary brush set for providing a secondary circuit through said rotor and for producing a secondary flux, means for electrically interconnecting the brushes of said secondary brush set, means including a stator associated with said rotor for providing a flux path of low reluctance for fluxes produced by said rotor, means including a variator field exciting winding associated with said stator and connected across said secondary brush set for producing a component of flux along the axis of said primary flux, means associated with said stator and arranged to provide an additional leakage path for flux produced by said rotor and for diverting said rotor flux from said variator field exciting winding, and means including a stabilizing field exciting winding associated with said stator for producing an electrical potential in said secondary circuit opposing variations in the electrical potential between the brushes of said secondary brush set.

17. A metadyne generator having a rotor provided with windings and a commutator, means including a primary brush set associated with said commutator for providing a primary circuit through said rotor and for producing a primary flux, means including a secondary brush set electrically displaced from said primary brushes for providing a secondary circuit through said rotor and for producing a secondary flux, means including a stator associated with said rotor for providing a flux path of low reluctance for fluxes produced by said rotor, means including a variator field exciting winding associated with said stator and connected across said secondary brush set for producing a component of flux on the axis of said primary flux, means associated with said stator arranged to provide an additional leakage path for flux produced by said rotor for diverting said rotor flux from said variator field exciting winding, a stabilizing field exciting winding arranged to produce an electrical potential in said secondary circuit opposing variations in the electrical potential between the brushes of said secondary brush set, and means dependent upon the electrical potential across said secondary brush set for energizing said stabilizing field exciting winding.

18. A metadyne generator having a rotor provided with windings and a commutator, means including a primary brush set associated with said commutator for providing a primary circuit through said rotor and for producing a primary flux, means including a secondary brush set electrically displaced from said primary brush set for providing a secondary circuit through said rotor and for producing a secondary flux, means electrically interconnecting said secondary brushes, means including a stator associated with said rotor for providing a flux path of low reluctance for fluxes produced by said rotor, means including a variator field exciting winding associated with said stator and connected across said secondary brush set for producing a component of flux on the axis of said primary flux, means including a stabilizing field exciting winding for producing an electrical potential in said secondary circuit opposing variations in the electrical potential between the brushes of said secondary brush set, means for energizing said stabilizing field exciting winding in accordance with the electrical potential across said primary brush set, and means associated with said stator arranged to provide an additional leakage path for flux produced by said rotor for affecting said rotor flux with respect to one of said field exciting windings.

19. A metadyne generator having a rotor provided with windings and a commutator connected thereto, means including a primary brush set associated with said commutator for providing a primary circuit through said rotor and for producing a primary flux, means including a secondary brush set associated with said commutator and electrically displaced from said primary brush set for providing a secondary circuit through said rotor, a variator field exciting winding arranged to produce a flux substantially on the axis of said primary flux, means dependent upon the relation of the electrical potential across said primary brush set and the electrical potential across said secondary brush set for energizing said variator field exciting winding, a second variator field exciting winding arranged to affect said primary flux, and means for energizing said second variator field exciting winding in accordance with the current in said primary circuit.

GIUSEPPE MASSIMO PESTARINI.